United States Patent [19]

Wang et al.

[11] Patent Number: 5,570,802
[45] Date of Patent: Nov. 5, 1996

[54] BATTERY SOLUTION VESSEL STRUCTURE

[76] Inventors: Juei-Liu Wang, No. 3, Lane 330, Da-Chyau 1st.; Jui-Chih Wang, No. 37, Alley 22, Lane 139, Da-Chyau 1st., both of Yung-Kang City, Tainan Hsien, Taiwan

[21] Appl. No.: 538,271

[22] Filed: Oct. 2, 1995

[51] Int. Cl.$^6$ .................................................. A47G 19/00
[52] U.S. Cl. .......................................... 220/23.8; 215/355
[58] Field of Search .................................. 270/23.8, 23.4, 270/23.2, 352; 215/355, 358

[56] References Cited

U.S. PATENT DOCUMENTS

| | | | |
|---|---|---|---|
| 318,325 | 5/1885 | Thayer | 215/358 |
| 3,194,426 | 7/1965 | Brown, Jr. | 220/23.4 |
| 4,188,457 | 2/1980 | Throp | 215/355 X |
| 4,472,357 | 9/1984 | Levy et al. | 220/23.4 X |
| 5,005,721 | 4/1991 | Jordan | 220/23.4 |

*Primary Examiner*—Steven M. Pollard
*Attorney, Agent, or Firm*—Morton J. Rosenberg; David I. Klein

[57] ABSTRACT

A battery solution vessel structure is provided which consists of several linked bottles. Each bottle has a mouth portion on its top. Below the mouth, a bottleneck provides a connection to bottle body. The bottleneck has an internal surface with an inverted conical contour that is sealed by a cylindrical elastic gland cover, made of a foam material. The diameter of the gland cover is slightly larger than the bottleneck smallest internal diameter for providing a tight seal.

2 Claims, 7 Drawing Sheets

BATTERY SOLUTION VESSEL STRUCTURE

BACKGROUND OF THE INVENTION

1. Field of the Invention

The present invention relates to a battery solution vessel structure, and more particularly to a vessel structure easily opening and emptying out smoothly and easily, with a splash-proof device for the diluted sulphuric acid solution in the bottles.

2. Description of the Prior Art

As so far, almost accumulators produced by the manufactures are packaged into battery body and battery solution separately, they are blent together until getting the practicing place to provide power for using. Therefore, "a filling device in necessity" design prevents the accumulator due to filled too early wearing out before installed on the applied place. In the prior application case, the battery solution vessel A is consisted of several bottles A1 linked in a row, like FIG. 4 showing the mouth A11 of every bottle A1 is sealed with the plastic cork A2 for preventing the solution splashing out, and a C-membrane A24 is set upon the bottom flat A23 of the plastic cork A2, said cork A2 is soldered with the mouth A11 by ultrasonic for sealing. When operating, the seal is opened with the aid of a funnel B like FIG. 6 showing which is holden in shape corresponding to the outline of the upper of vessel A, and in which corresponding to every mouth A11 there is a punch B1 extended out, first cover the funnel B on the top of the vessel A, let every punch B1 oppose to the corresponding mouth A11, next press down the funnel B to make the punch B1 break through the cork A2 on the mouth A11 along the C-membrane A24, then take up the vessel A with the funnel B together to make the opening of the funnel B oppose to the corresponding hole of the battery to spill the battery solution into the battery; in an other structure, like FIG. 5 showing sticking aluminium foil cover A3 on the mouth A11 of the bottle A1, when using break through the foil cover A3 with the punch B1 of the funnel B for pouring the solution into the battery. Except these ways, there is a way adopted in common use so far, as FIG. 7 showing every mouth A11 of the vessel A is sealed with a threaded top A4 tightly. So however which sealing structure is adopted, they still can not get to perfection, they still have the following shortcomings:

1. Due to the plastic cork A2 over-hard, during breaking through with the punch B1, it need a big force if opening all the corks A2 in the same time, and it is difficult to keep the balance of the vessel A avoid the solution spilling out.

2. The alumunium foil cover A3 is easy to break through, but the miss action or accident is as easily as the correct action.

3. When breaking through the corks A2 or the alumunium foil cover A3 with the punch B1 on the funnel B, because the C-membrane A24 part or the foil cover A3 is not departed completely and still attached partly to the mouth A11 to occur the battery solution flowing out turbulently.

4. However the cork A2 sealing or the alumunium foil cover A3 sealing, the processes are too complex to reduce the production cost.

5. Adopting the threaded top A4 to seal, it is easy to come loose in the transfer, therefor the diluted sulphuric acid solution in the bottles may be flowing out to corrode other subjects; in the other hand, due to losing some solution, the original quantity of the solution in the vessel A is decreased to affect the battery filled not enough and the quality of the battery. Addition, the threaded sealing seem to feel bore to loose the top in ones, especially in filling large amount of battery.

6. During pouring into the battery after breaking through the aluminium foil cover A3, the battery solution can react chemically with the metal alumunium to affect the battery quality.

According to the above-mentioned shortcoming, an object of the present invention is to provide a sealing structure having safer and simpler, not only rapidly, but also having a better effect of preventing the solution splashing keeping the flowing smoothly.

SUMMARY OF THE INVENTION

For meeting the above-mentioned objects, the present invention provides a battery solution vessel consisted of several linked bottles, the feature of the present invention is that below the every mouth there is an upside down cone shaped bottleneck, in which a gland cover make of foam stuff can be plugged up for sealing, and the whole vessel is covered with a shrink film for protecting the sealing in the bottlenecks, when discharging the gland cover can be pulled into the bottle easily and float on surface of the liquid unlocking the liquid flowing.

DESCRIPTION OF THE EMBODIMENT

Figure 1:
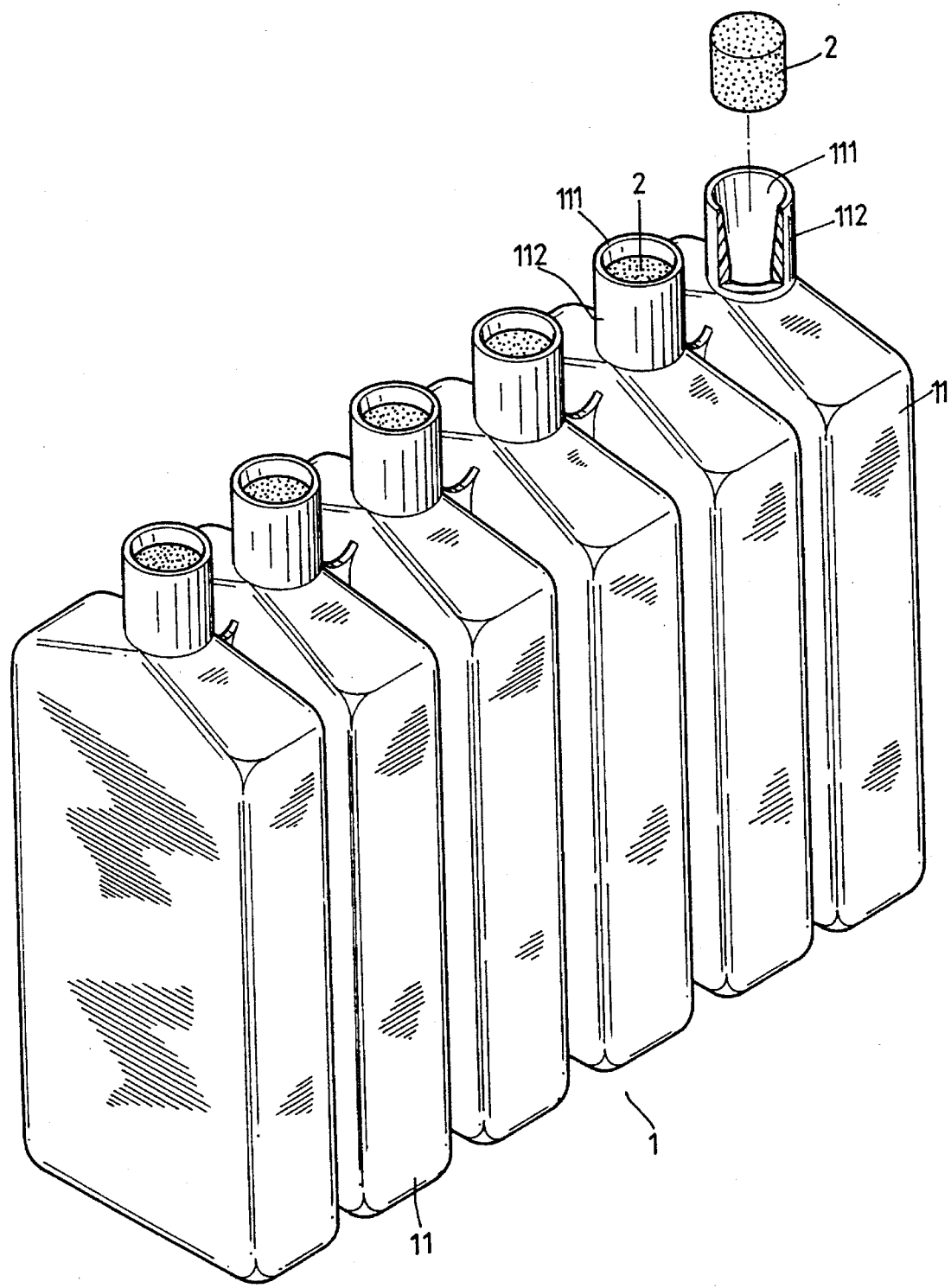
FIG. 1 is a perspective view of the present invention.
Figure 2:
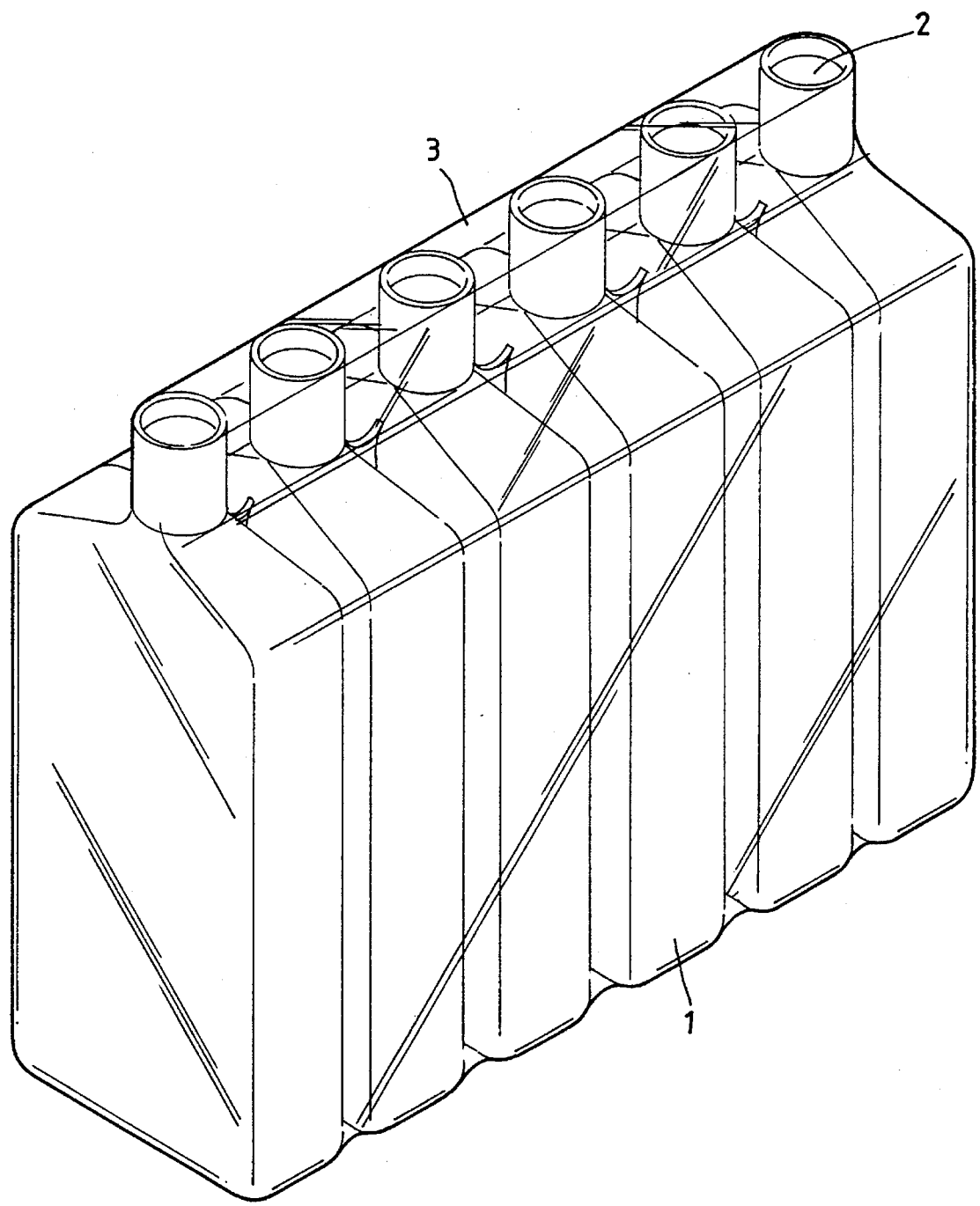
FIG. 2 a perspective view of the packed present invention.

Referring to FIG. 1 the present invention is a battery solution vessel 1, which is consisted of several linked bottles 11, the bottleneck 112 located between the mouth 111 and the bottle body 11 is appeared to an upside down cone shaped for plugging up an elastic cylinder gland cover 2 make of foam stuff, the diameter of the gland cover 2 is bigger than the bottleneck internal's slightly.

So due to the gland cover 2 is make of foam stuff and elastic slightly and the bottleneck 112 is designed to an upside down cone, the gland cover 2 is plugged up the bottleneck 112 and crushed out of shaped, so there is an internal stress between them, just this internal stress not only prevents the cork slip out unexpected, but also avoids the liquid give away. And the shrink film 3 is not need to tear off fully, it can be broken through in the same time with the gland cover 2 easily.

Figure 3:
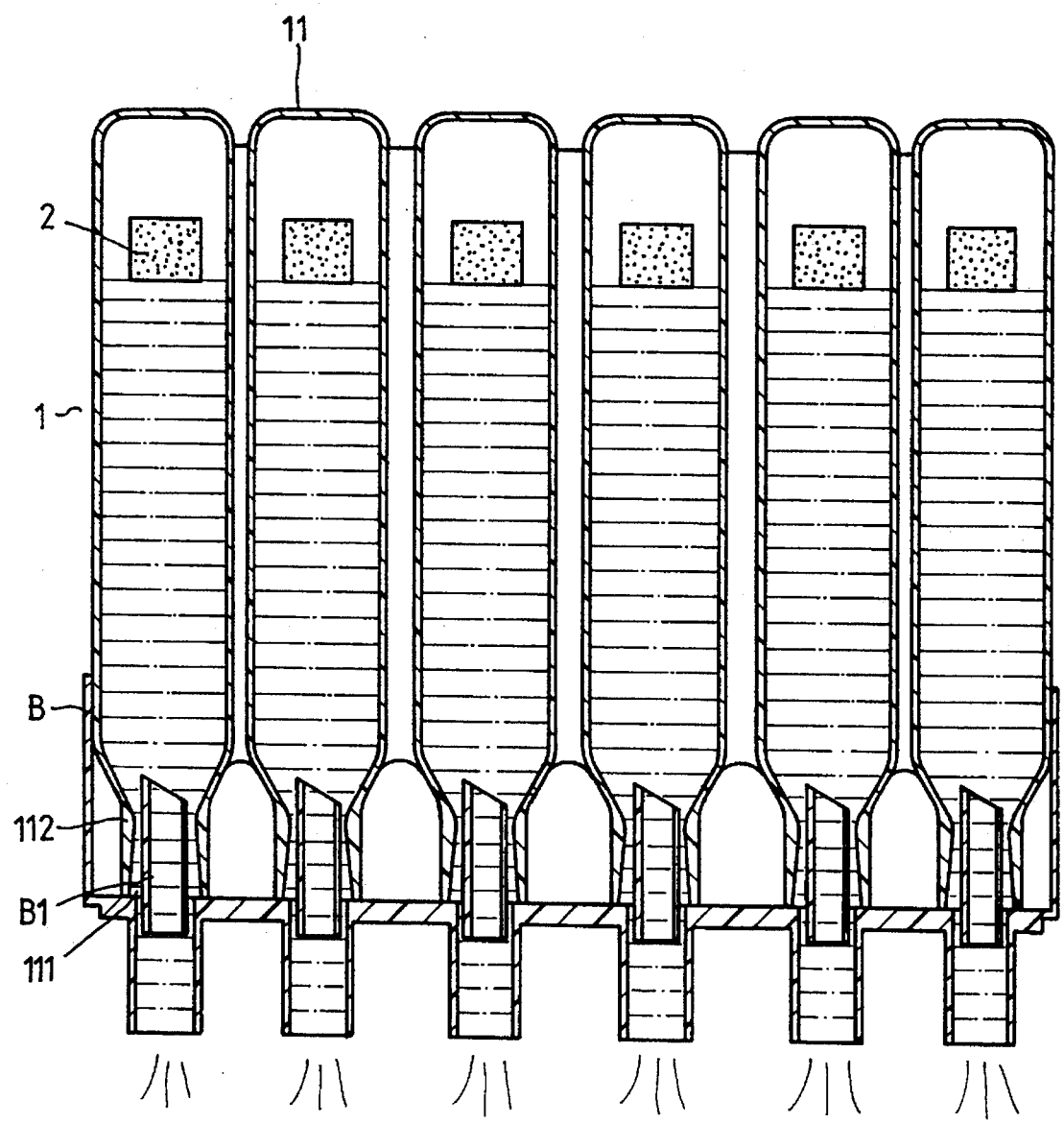
FIG. 3 is a cross-section view showing practicing of the present invention.
Figure 4:
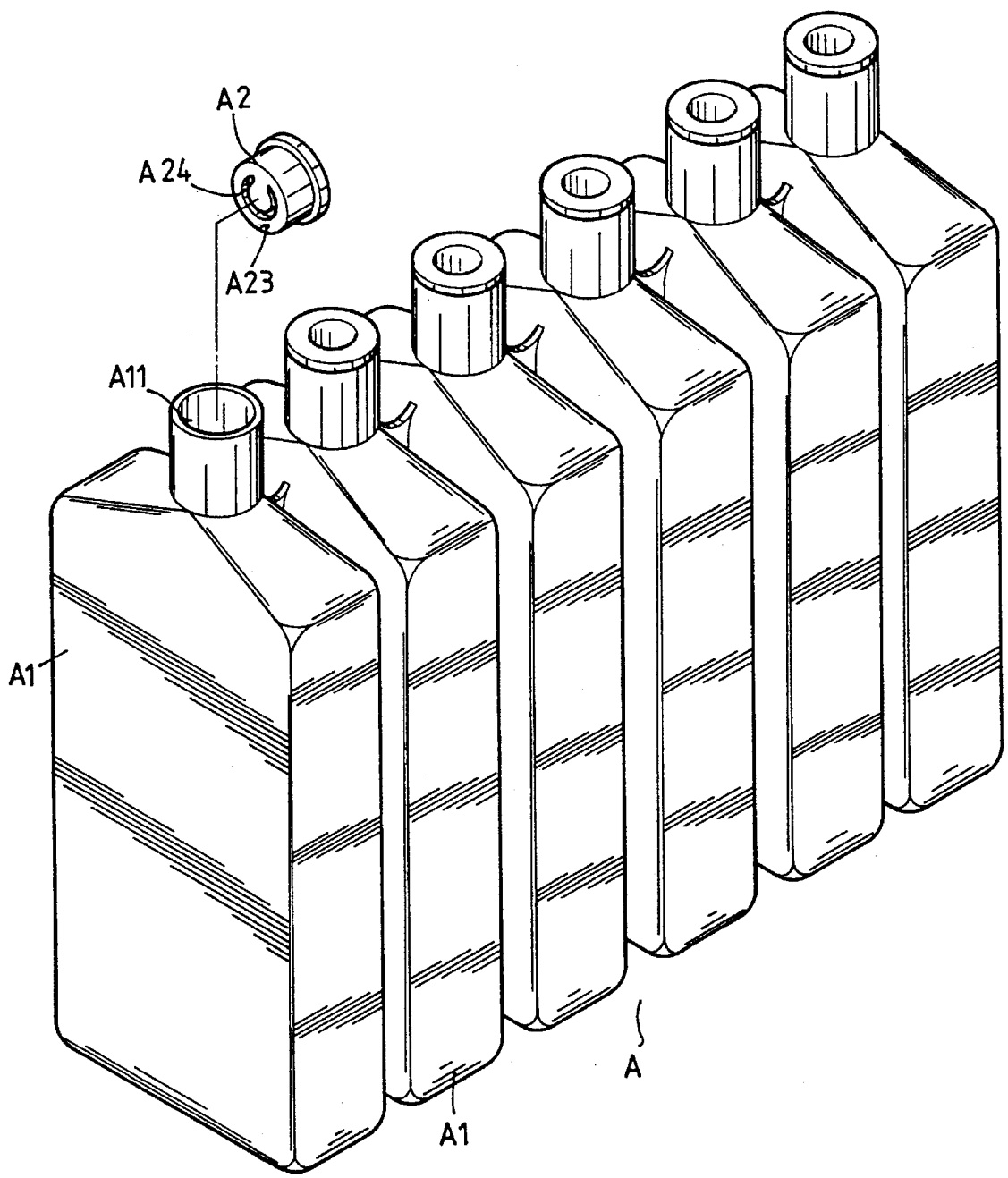
FIG. 4 is a perspective view showing a conventional battery solution vessel (A)
Figure 5:
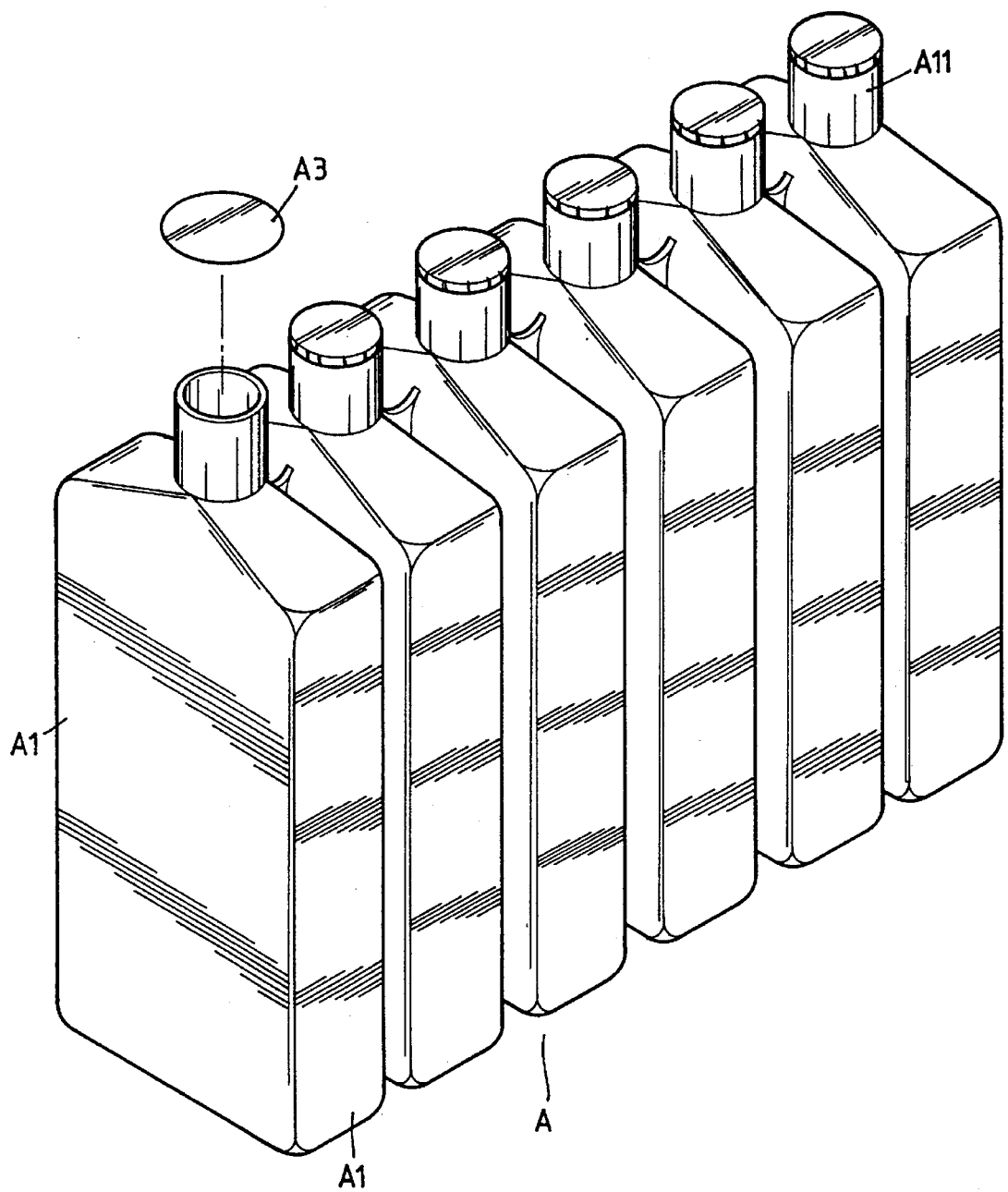
FIG. 5 is a perspective view showing a conventional battery solution vessel (B)
Figure 6:
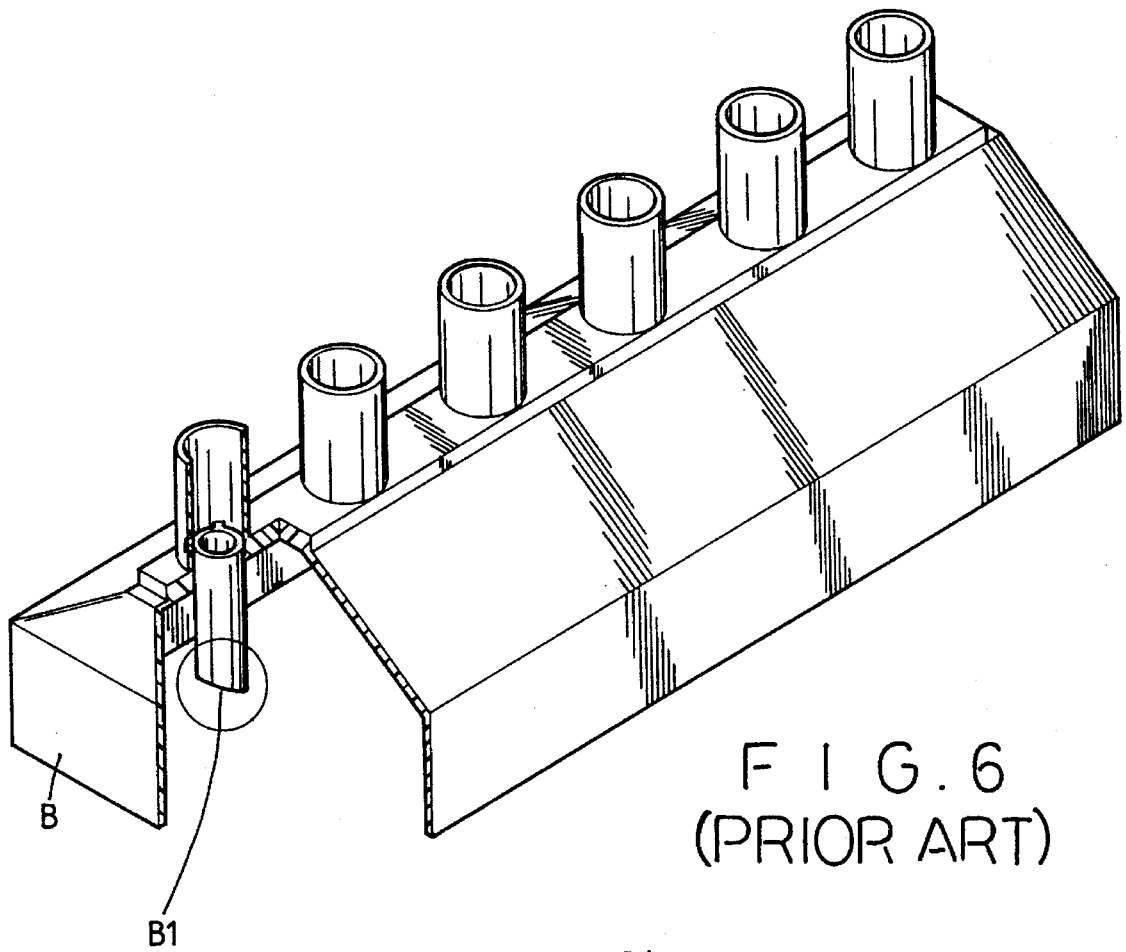
FIG. 6 is a perspective view showing a conventional funnel.
Figure 6A:
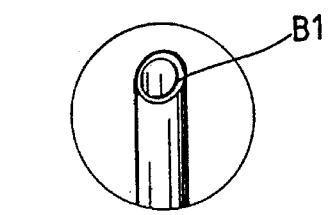
FIG. 6A is an enlarged view of the circle of FIG. 6.
Figure 7:
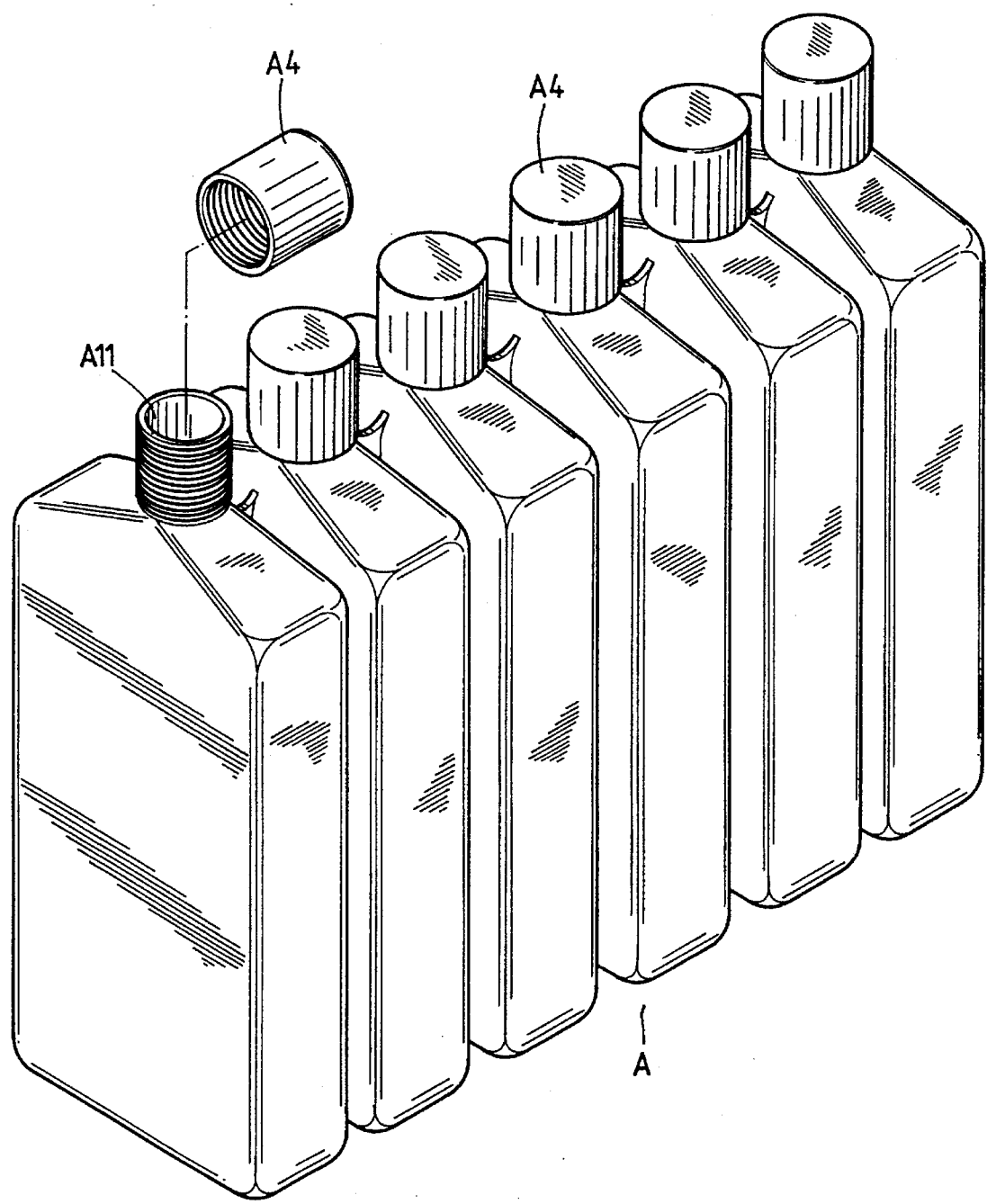
FIG. 7 is a perspective view showing a conventional battery solution vessel (C).

When operating, first put said funnel B like FIG. 3 showing into the corresponding holes of the battery body let the punch B1 direct up, then turn the vessel 1 unopened upside down and let the mouth 111 of every bottle 11 oppose to the corresponding punch B1, slightly pressing down the vessel 1, the gland cover can be pushed into the bottle body 11 and floats up to the surface of the liquid, meanwhile the liquid contented in the bottles 11 flow into the battery body along the funnel B smoothly and easily, as FIG. 3 showing.

I claim:

1. A battery solution vessel structure, comprising:

a plurality of linked bottles, each of said plurality of bottles having a bottle body with a bottleneck formed on one end thereof, said bottleneck having a through bore extending between an open mouth end and an internal cavity of said bottle, said through bore having an interior surface with an inverted conical contour, said inverted conical contour being defined by said mouth end having a first internal diameter and an opposing end of said bottleneck disposed adjacent said bottle body having a second internal diameter, said second diameter being less than said first diameter; and, a substantially cylindrically shaped gland cover formed of a foam material for sealing engagement with said bottleneck within said through bore, said gland cover having a third diameter, said third diameter being greater than said second diameter.

2. The battery solution vessel structure as recited in claim 1 further comprising a shrink wrap film covering said plurality of linked bottles.

* * * * *